(12) United States Patent
Hong

(10) Patent No.: US 11,488,482 B2
(45) Date of Patent: Nov. 1, 2022

(54) APPARATUS FOR CONTROLLING PLATOONING

(71) Applicants: HYUNDAI MOTOR COMPANY, Seoul (KR); KIA MOTORS CORPORATION, Seoul (KR)

(72) Inventor: Jeong Ki Hong, Seongnam-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 244 days.

(21) Appl. No.: 16/917,434

(22) Filed: Jun. 30, 2020

(65) Prior Publication Data
US 2021/0183251 A1    Jun. 17, 2021

(30) Foreign Application Priority Data
Dec. 17, 2019    (KR) .................. 10-2019-0169153

(51) Int. Cl.
*G08G 1/00*  (2006.01)
*H04W 4/46*  (2018.01)
*H04W 56/00* (2009.01)
*H04W 24/08* (2009.01)
*H04W 4/44*  (2018.01)

(52) U.S. Cl.
CPC ............ *G08G 1/22* (2013.01); *H04W 4/44* (2018.02); *H04W 4/46* (2018.02); *H04W 24/08* (2013.01); *H04W 56/004* (2013.01)

(58) Field of Classification Search
CPC .................. B60G 2800/166; G08G 1/22
See application file for complete search history.

(56) References Cited

U.S. PATENT DOCUMENTS

| | | | |
|---|---|---|---|
| 2010/0148940 A1* | 6/2010 | Gelvin | H01Q 9/0464 340/286.02 |
| 2013/0034016 A1* | 2/2013 | Bai | H04W 84/18 370/254 |
| 2020/0092685 A1* | 3/2020 | Fehrenbach | H04W 4/46 |
| 2020/0120459 A1* | 4/2020 | Nguyen | H04W 40/22 |
| 2020/0139945 A1* | 5/2020 | Schoenly | B61C 17/12 |
| 2020/0153559 A1* | 5/2020 | Cheng | H04W 28/0268 |
| 2020/0178043 A1* | 6/2020 | Cavalcanti | H04W 4/08 |
| 2021/0194645 A1* | 6/2021 | Li | H04L 1/1845 |

FOREIGN PATENT DOCUMENTS

WO    WO-2018064179 A1 *    4/2018

\* cited by examiner

*Primary Examiner* — Jamaal Henson
(74) *Attorney, Agent, or Firm* — Lempia Summerfield Katz LLC

(57) ABSTRACT

An apparatus for controlling platooning controls timing of transmitting or receiving a message. The apparatus includes a communication device to communicate with other vehicles in a platoon and to transmit a message, which is received from the other vehicles, in a form of a full message and includes a controller to generate logic message for the platooning, to check omission of the message from the full message received using the communication device, and to adjust a latency of the message when the omission of the message occurs.

19 Claims, 4 Drawing Sheets

APPARATUS FOR CONTROLLING PLATOONING

CROSS-REFERENCE TO RELATED APPLICATION

This application claims the benefit of priority to Korean Patent Application No. 10-2019-0169153, filed on Dec. 17, 2019, the entire contents of which are incorporated herein by reference.

TECHNICAL FIELD

The present disclosure relates to an apparatus for controlling platooning, and more particularly to a technology of controlling timing of transmitting or receiving a message.

BACKGROUND

Platooning is a scheme in which vehicles exchange motion and context information of a leading vehicle through real-time communication between the vehicles to maintain specific distances to preceding vehicles while travelling together. Since such platooning allows the vehicles to maintain a specific distance to the leading vehicle while travelling, the air resistance of the following vehicle is lowered to save the fuel efficiency, and the risk of the accident is reduced.

SUMMARY

An aspect of the present disclosure provides an apparatus for controlling platooning, capable of adjusting a latency of a message transmitted or received by monitoring an overlap section of a jitter, which is caused in communication between vehicles platooning.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, an apparatus for controlling platooning includes a communication device to communicate with other vehicles in a platoon and to transmit a message, which is received from the other vehicles, in a form of a full message. The apparatus further includes a controller to generate logic message for the platooning, to check omission of the message from the full message received using the communication device, and to adjust a latency of the message when the omission of the message occurs.

According to another aspect of the present disclosure, an apparatus for controlling platooning includes a communication device to transmit a first message, to receive a second message and a third message from other vehicles, and to transmit the first message, the second message, and the third message in a form of a full message, a message check device to check omission of a message from the full message, and a controller to adjust a latency of the message when the omission of the message occurs.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
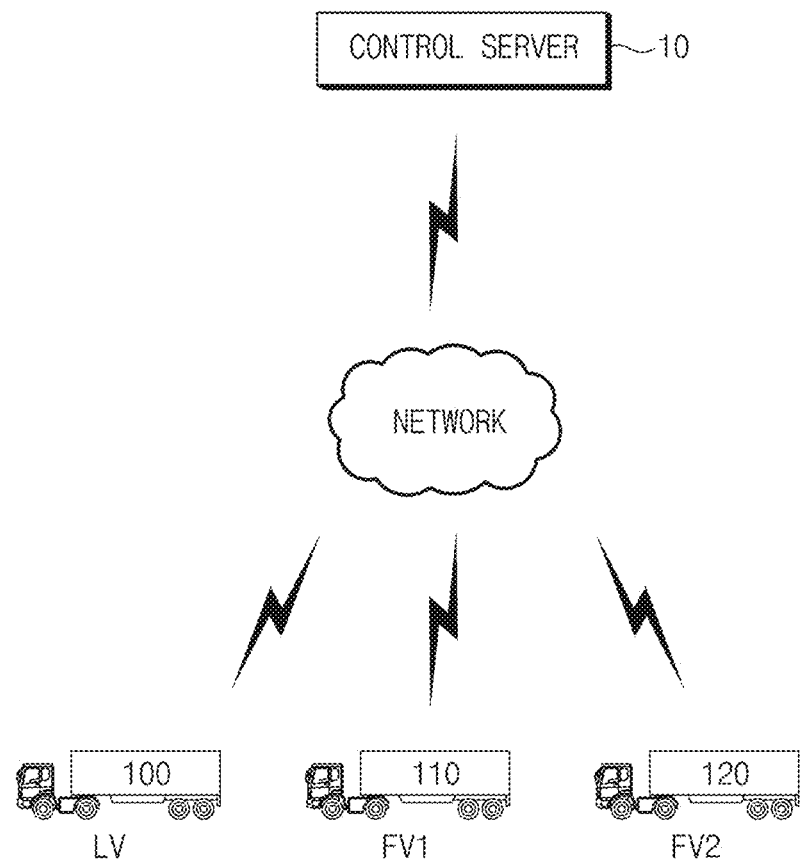
FIG. 1 is a view schematically illustrating a system for controlling platooning, according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings equal to the contextual meanings in the relevant field of art. Such terms should not be interpreted as having ideal or excessively formal meanings unless clearly defined in the present application. When a component, device, or element of the present disclosure is described as having a purpose or performing an operation, function, or the like, the component, device, or element should be considered herein as being "configured to" meet that purpose or to perform that operation, function, or the like. Further, the controller described herein may include a processor programmed to perform the noted operation, function, operation, or the like.

FIG. 1 is a view schematically illustrating a system for controlling platooning, according to an embodiment of the present disclosure.

Referring to FIG. 1, platooning means that one leading vehicle (LV) and one following vehicle (FV1 or FV2) travel while forming a platoon (group). According to an embodiment of the present disclosure, the leading vehicle (LV) may refer to a front-most vehicle, for example, a host vehicle, in the line (platooning vehicle line) of vehicles platooning. In addition, according to an embodiment of the present disclosure, the following vehicle (FV1 or FV2) may refer to another vehicle following the leading vehicle (LV).

The system for controlling the platooning includes a control server 10 connected with the system through wireless or wired communication and apparatuses (platooning control apparatuses) 100 to 120 for controlling platooning. In this embodiment, the wired or wireless communication technology may employ a wired communication technology, such as a local area network (LAN), a wide area network (WAN), and/or a wireless communication technology such as wireless fidelity (WiFi), Long Term Evolution (LTE), Bluetooth and Vehicle to Everything (V2X).

According to an embodiment of the present disclosure, the platooning controlling apparatuses 100 to 120 may be on-board units (OBU) mounted in vehicles. The platooning controlling apparatuses 100 to 120 register vehicles in the control server 10 depending on a specific vehicle registration procedure to use a platooning service.

The platooning controlling apparatuses 100 to 120 support communication among vehicles (LV, FV1, and FV2) employing the platooning service. In other words, the platooning controlling apparatuses 100 to 120 support communication among vehicles (LV, FV1, and FV2) registered in the control server 10. The platooning controlling apparatuses 100 to 120 exchange travelling information (operating information) of the vehicles with other vehicles in a platoon (group).

The control server 10 manages and controls the vehicles (LV, FV1, and FV2) registered for the platooning service. The control server 10 collects vehicle information (a departure, a destination, and a vehicle number) from the vehicles (LV, FV1, and FV2) registered for the platooning service.

The control server 10 forms a platoon (group) with at least two vehicles (LV, FV1, and FV2) to perform the platooning based on the collected vehicle information. The control server 10 may select a leader vehicle (a leading vehicle (LV)) when forming platooning. The control server 10 transmits information on the approval of the platooning and information (platoon information) on the formed platoon to vehicles (LV, FV1, and FV2) in the platoon when the platoon is completely formed.

Although the embodiment of the present disclosure discloses that the platoon is formed, the present disclosure is not limited. For example, the leading vehicle (leader vehicle; LV) may form a platoon depending on the requests from surrounding vehicles to perform a platoon.

Figure 2:
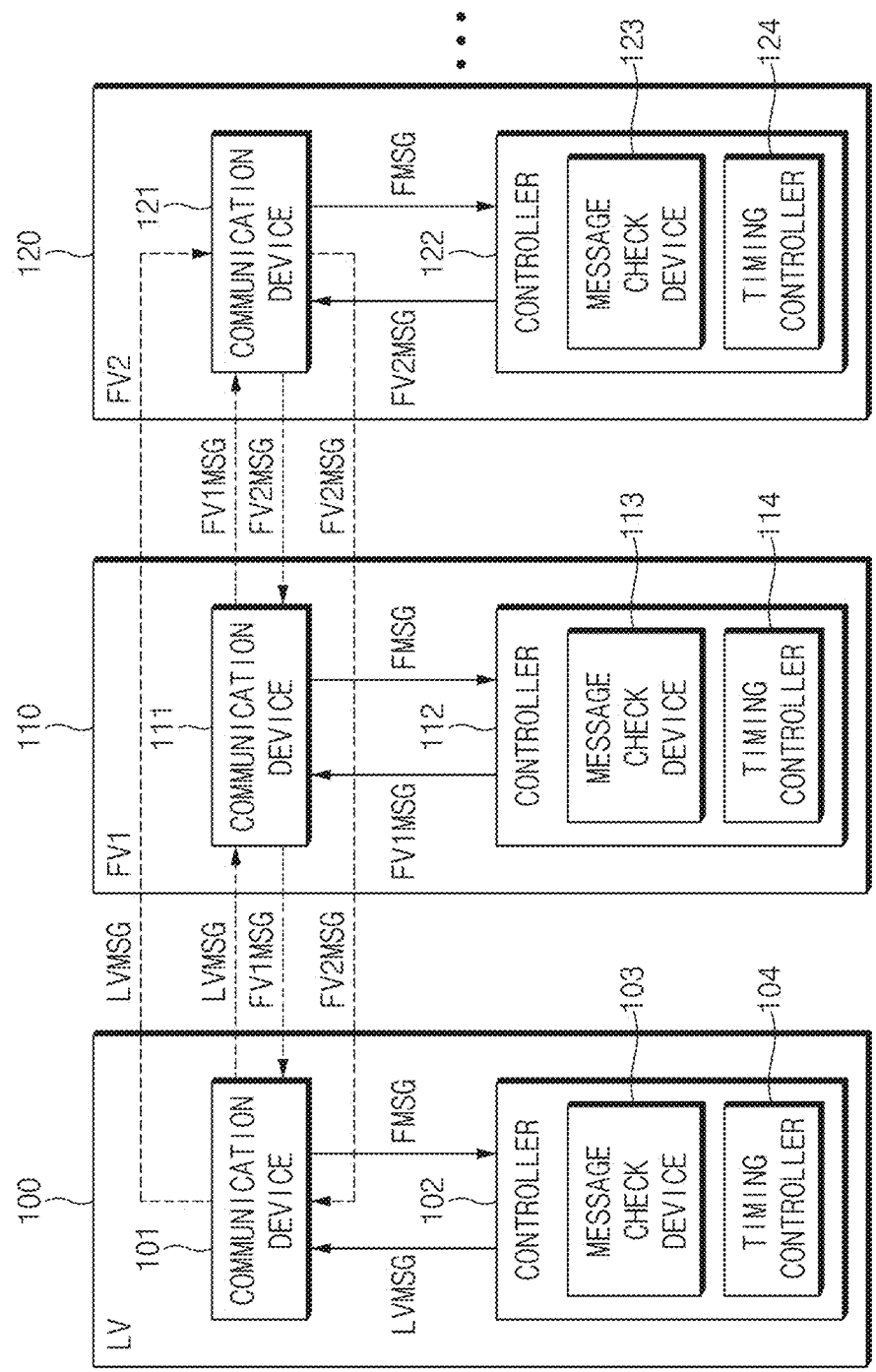
FIG. 2 is a view illustrating an apparatus for controlling platooning in detail, according to an embodiment of the present disclosure.

FIG. 2 is a view illustrating the platooning controlling apparatuses 100 to 120 in detail, according to an embodiment of the present disclosure. The following description of the embodiments of FIG. 2 is made, in which the platooning controlling apparatuses 100 to 120 are classified into first, second, and third platooning controlling apparatuses.

Referring to FIG. 2, the first platooning controlling apparatus 100 may include a leading vehicle (LV) or a following vehicle (FV1 or FV2). In addition, the second platooning controlling apparatus 110, or the third platooning controlling apparatus 120 may be included in the following vehicle (FV1 or FV2), or the leading vehicle (LV).

The first platooning controlling apparatus 100 may include a communication device 101 and a controller 102. The second platooning controlling apparatus 110 may include a communication device 111 and a controller 112. The third platooning controlling apparatus 120 may include a communication device 121 and a controller 122.

In this embodiment, the communication devices 101, 111, and 121 make communication with the controllers 102, 112, and 122 and the platooning controlling apparatuses 100, 110, and 120 mounted in other vehicles. For example, the other vehicles may indicate a preceding vehicle, a leading vehicle, a rear vehicle, and/or a following vehicle.

In addition, the communication devices 101, 111, and 121 may make communication with devices such as an electric control unit (ECU) mounted in the vehicle, a mobile terminal, and the control server 10. For example, the mobile terminal may include a smartphone, a computer, a notebook, and/or a tablet.

The communication devices 101, 111, and 121 may receive a map, road information, traffic situation information, and platooning related information from the control server 10. The communication devices 101, 111, and 121 may employ in-Vehicle network (IVN) communication, vehicle to everything (V2X) communication, and/or wireless communication.

The In-Vehicle Network communication may employ Controller Area Network (CAN) communication, Media Oriented Systems Transport (MOST) communication, Local Interconnect Network (LIN) communication, and/or X-by-Wire (Flexray) communication. In addition, the V2X communication may be implemented with Vehicle to Vehicle (V2V) communication and/or vehicle to infrastructure (V2I) communication. The wireless communication may be implemented with at least one of wireless Internet (e.g., Wi-Fi), near field communication (E.g., Bluetooth, Zigbee, and infrared communication), and mobile communication.

The controllers 102, 112, and 122 control the overall operations of the platooning controlling apparatuses 100 to 120. The controllers 102, 112, and 122 may include processors selected from at least one of an Application Specific Integrated Circuit (ASIC), a Digital Signal Processor (DSP), Programmable Logic Devices (PLD), Field Programmable Gate Arrays (FPGAs), a Central Processing unit (CPU), microcontrollers, or microprocessors.

The controllers 102, 112, and 122 transmit a message for requesting platooning to the control server 10 through the communication devices 101, 111, and 121. In other words, the controllers 102, 112, and 122 may request the control server 10 to provide the platooning service.

The controller 102, 112, and 122 may start platooning initialization when platooning information is received, in other words, platooning is completely formed. In this embodiment, the platooning initialization refers to a procedure of inspecting functional operation synchronization of vehicles (leading vehicle and following vehicle) in the platoon after forming the platoon.

The controllers 102, 112, and 122 may transmit inspection commands to the following vehicles (FV1 and FV2) through the communication devices 101, 111, and 121 when a host vehicle is the leading vehicle (LV). The controllers 102, 112, and 122 transmit, to the leading vehicle (LV), a function inspection result (a function operation time point and an inter-vehicle distance to the preceding vehicle) in response to the request for inspection by the leading vehicle (LV), when the host vehicle is the following vehicle (FV1 or FV2).

The controller 102 of the leading vehicle (LV) inspects lamp operation synchronization, a deceleration operation, an acceleration operation, a steering control operation, and an emergency mode operation of at least one or more following vehicles (FV1 and FV2). The controller 102 inspects the function operations of the following vehicles (FV1 and FV2), and finally approves that the platoon is formed, and performs platooning when the functional operations are normal.

Meanwhile, the controller 102 may include a message check device 103, and a timing controller 104. Meanwhile, the controller 112 may include a message check device 113, and a timing controller 114. Meanwhile, the controller 122 may include a message check device 123, and a timing controller 124.

According to the embodiment of the present disclosure, the controllers 102, 112, and 122 may adjust latencies of messages transmitted or received by monitoring the overlap sections of jitters caused in communication among vehicles (LV, FV1, and FV2) during platooning.

To this end, the message check devices 103, 113, and 123 of the controllers 102, 112, and 122 check whether messages transmitted or received between vehicles through the communication devices 101, 111, and 121 are omitted. In addition, the message check devices 103, 113, and 123 check a packet receive rate (PRR) of a full message (FMSG) when the message check devices 103, 113, and 123 check whether the messages are omitted due to a jitter.

In addition, the timing controllers 104, 114, and 124 of the controllers 102, 112, and 122 adjust latencies by shifting timing of transmitting or receiving the message by a specific period when the message check devices 103, 113, and 123 check that the messages are omitted due to the jitter.

For example, the controller 102 of the first platooning controlling apparatus 100 may transmit a message (LVMSG) to the communication device 101 and may receive a full message (FMSG) from the communication device 101. In this embodiment, the full message (FMSG) may be received in the form of a data packet. In addition, the communication device 101 may transmit the message (LVMSG) to the communication devices 111 and 121. In addition, the communication device 101 may receive messages (FV1MSG and FV2MSG) from the communication devices 111 and 121.

For example, the controller 112 of the second platooning controlling apparatus 110 may transmit a message (FV1MSG) to the communication device 111 and may receive a full message (FMSG) from the communication device 111. Further, the communication device 111 may transmit the message (FV1MSG) to the communication devices 101 and 121. In addition, the communication device 111 may receive messages (LVMSG and FV2MSG) from the communication devices 101 and 121.

For example, the controller 122 of the third platooning controlling apparatus 120 may transmit a message (FV2MSG) to the communication device 121 and may receive a full message (FMSG) from the communication device 121. Further, the communication device 121 may transmit the message (FV2MSG) to the communication devices 101 and 111. In addition, the communication device 121 may receive messages (LVMSG and FV1MSG) from the communication devices 101 and 111.

The controllers 102, 112, and 122 and the communication devices 101, 111, and 121 make communication inside the vehicles (LV, FV1, and FV2) platooning (or to be platooned). The vehicles (LV, FV1, and FV1) platooning (or to be platooned) broadcast a host-vehicle message to the outside to make communication among communication devices 101, 111, and 121 outside the vehicles (LV, FV1 and FV2).

Figure 3:
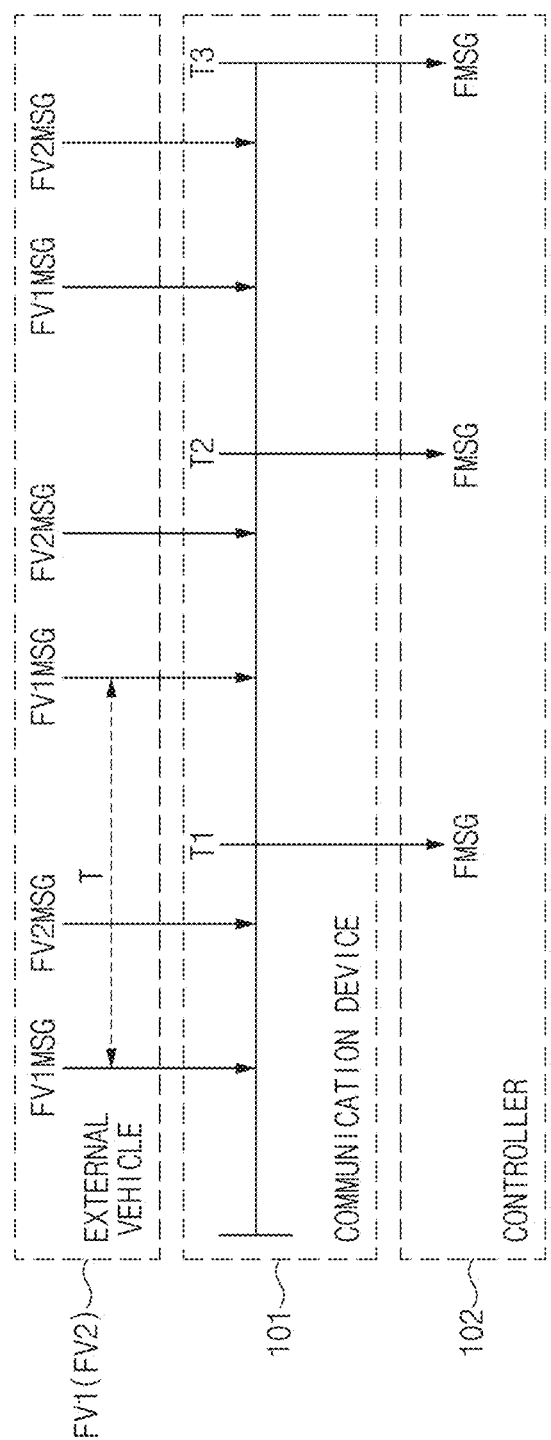
FIG. 3 is a view illustrating timing of transmitting a message in the apparatus for controlling the platooning of FIG. 2, according to an embodiment.

FIG. 3 is a view illustrating the timing of transmitting a message in the platooning controlling apparatuses 100, 110, and 120 according to an embodiment of FIG. 2. The following description of an embodiment of FIG. 3 is made regarding the operation of the first the platooning controlling apparatuses 100, 110, and 120.

The communication device 101 of the vehicle (LV) receives a message (FV1MSG or FV2MSG) from the communication devices 11, 121 of several vehicles (FV1 and FV2) participating in platooning or to be expected to participate in platooning. The message (FV1MSG or FV2MSG) received in the communication device 101 may be received at a specific cycle (T).

The controller 102 of the vehicle (LV) performs a control operation to generate logic, such as vehicle control, for platooning, in the form of a message, and to transmit or receive the message at preset timing T1, T2, or T3. In this embodiment, the preset timing T1, T2, or T3 may have specific cycle.

The communication device 101 transmits, to the controller 102, a full message (FMSG) obtained by collecting messages (FV1MSG and FV2MSG), which are previously received, of external vehicles (FV1 and FV2) such that the messages (FV1MSG and FV2MSG) are used in synchronization with the control cycle of the controller 102.

However, when the message is transmitted or received, a jitter having a fine error may be caused. When the communication device 101 transmits, to the controller 102, the obtained full message (FMSG), the timing is not synchronized due to the jitter shaken, so the message (FV1MSG or FM2MSG) may be omitted. In particular, once the overlap section of the messages occurs as the size of the jitter is significantly low, the messages may be frequently omitted for a long time.

In other words, when the overlap section of the jitter is caused in the full message (FMSG), a specific message is omitted. In this case, it is difficult to determine whether the omission of the message is caused by a packet receive rate (PRR) which is lowered or by a jitter.

Hereinafter, according to an embodiment of the present disclosure, the message check device 103 monitors packet receive rates of the full messages (FMSG) actually received from other vehicles (FV1 and FV2) through the communication device 101. According to an embodiment of the present disclosure, the message check device 103 checks the full message (FMSG) to compare the packet receive rate of an internal full message (FMSG) received in the controller 102 with a packet receive rate of the full message (FMSG) actually received in the controller 102. In other words, the message check device 103 checks whether the difference is made between the packet receive rates of the full messages FMSG due to by the jitter.

According to an embodiment of the present disclosure, the timing controller 104 minimizes the influence exerted by the overlap section of the jitters by shifting the timing of transmitting or receiving the message by a specific period, when the difference is made in the packet receive rate.

Figure 4:
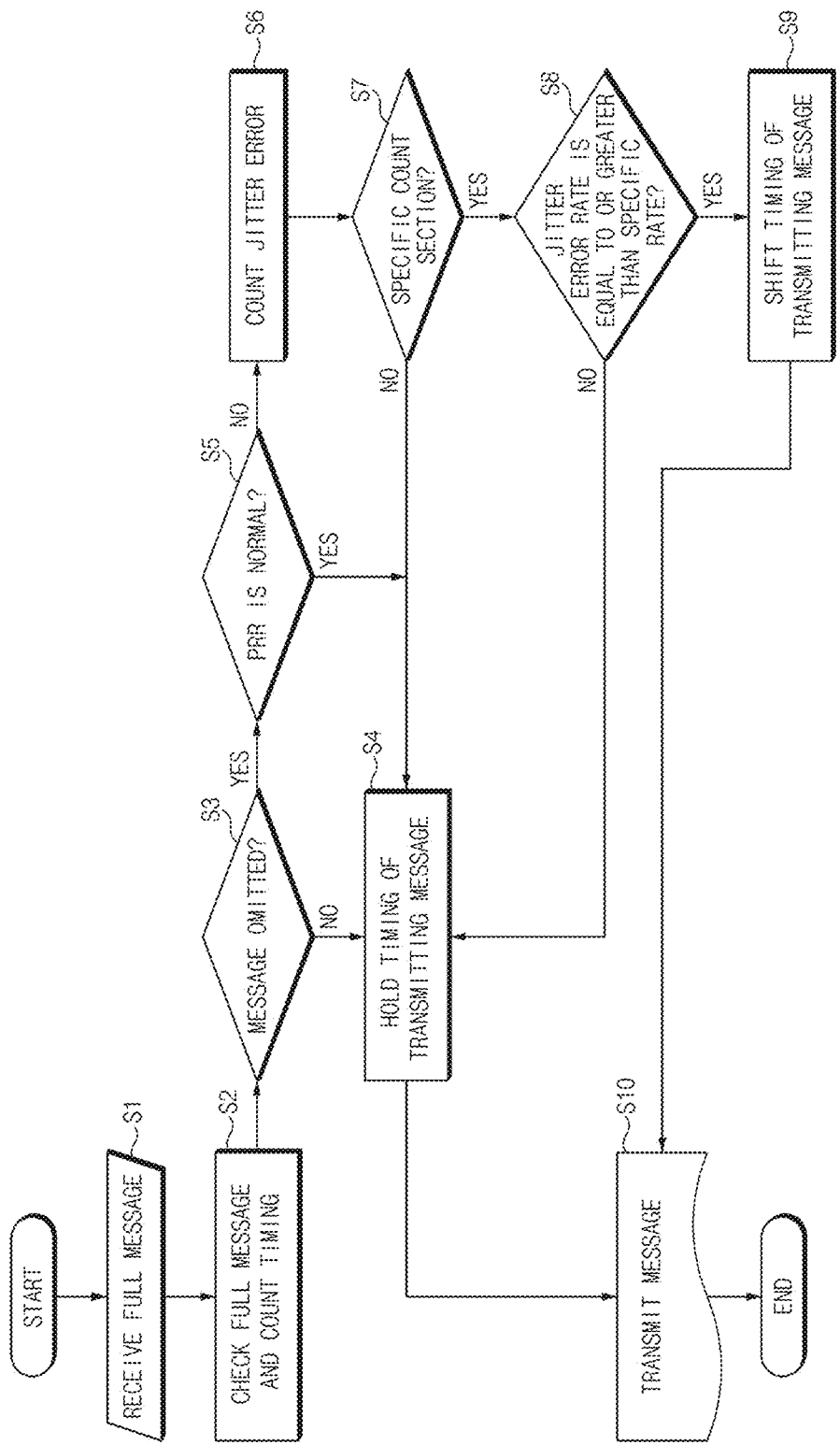
FIG. 4 is a flowchart illustrating the operation of the apparatus for controlling the platooning, according to an embodiment of the present disclosure.

FIG. 4 is a flowchart illustrating the operation of the apparatus for controlling the platooning, according to an embodiment of the present disclosure. According to an embodiment of FIG. 4, the operation of the first platooning controlling apparatus 100 of the platooning controlling apparatuses 100, 110, and 120 is described by way of example.

First, the message check device 103 receives a full message (FMSG) from the communication device 101 (S1). In other words, the messages of other vehicles (FV1 and FV2) are collected and processed in the form of the full message (FMSG) in the vehicle (LV). In this embodiment, the full message (FMSG) includes information on the internal message (LVMSG) of the host vehicle (LV), messages (FV1MSG and FV2MSG) from other vehicles (FV1 and FV2), and a packet receive rate (PRR).

The message check device 103 may check the received full message (FMSG) and count the timing of receiving the full message (FMSG) (S2). In this embodiment, the message check device 103 may count up the timing of receiving the full message (FMSG).

Thereafter, the message check device 103 determines whether the message omission occurs in the received full message (FMSG) (S3).

When the message omission does not occur in the full message (FMSG), the timing of transmitting the message is held for a specific time (S4). Thereafter, the message (LVMSG) is transmitted to the communication device 101 after the timing of transmitting the message elapses for specific time (S10). On the contrary, when the message omission occurs in the full message (FMSG) in S3, the message check device 103 determines whether the packet receive rate is normal in the received full message (FMSG) (S5).

When the packet receive rate of the received full message (FMSG) is normal, S4 and S10 are performed, so the timing of transmitting the message is held for a specific time and then the message (LVMSG) is transmitted. On the contrary, when the packet receive rate of the received full message (FMSG) is not normal (abnormal) in S5, a jitter error is counted (S6). In this embodiment, the message check device 103 may count up the jitter error.

Thereafter, the message check device 103 determines whether the count value of the jitter error is in a specific count section (S7). In this embodiment, the specific count section may be preset to check the count value of the jitter error.

When the count value of the jitter error is not in the preset count section, S4 and S10 are performed to hold the timing of transmitting the message for a specific time and to transmit the message (LVMSG). On the contrary, when the count value of the jitter error is in the preset count section in S7, the message check device 103 determines whether the jitter error rate is equal to or greater than a specific rate (S8). In this embodiment, the specific rate may be preset to check the jitter error rate. For example, the message check device 103 may determine that adjustment of a latency is required when a jitter error rate is 20% or more.

When the jitter error rate is less than the specific rate, S4 and S10 are performed, the timing of transmitting the message is held for a specific time, and the message (LVMSG) is transmitted. When the jitter error rate is equal to or greater than the specific rate in S8, the message check device 103 shifts the timing of transmitting the message by a specific period (S9) and transmits the message (S10). In other words, when the jitter error rate is equal to or greater than the specific rate, the timing of transmitting the message may be shifted by a specific latency.

In this embodiment, the specific period (latency) may be preset to delay the timing of transmitting the message. According to another embodiment, the specific period (latency) may be changed based on the timing of transmitting/receiving the message of another vehicle.

Therefore, according to the embodiment of the present disclosure, when message omission occurs due to the jitter in the full message (FMSG), the timing of transmitting (receiving) the message is delayed by a specific time to avoid the overlap section of the jitter. Accordingly, a message transmit or receive rate may be stabilized.

According to an embodiment of the present disclosure, the accident to be caused due to the error of the message between vehicles during platooning may be prevented in advance by adjusting the latency of the message transmitted or received between vehicles.

Hereinabove, although the present disclosure has been described with reference to specific embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. An apparatus for controlling platooning, the apparatus comprising:
   a controller; and
   a communication device configured to communicate with other vehicles in a platoon, to generate a full message, which is comprised of messages received from the other vehicles, and to transmit the full message to the controller,
   wherein the controller is configured to check an omission of an omitted message of the messages received from the other vehicles from the full message received using the communication device, and to adjust a latency of the omitted message when the omission of the omitted message occurs, and
   wherein the controller includes
      a message check device configured to check a packet receive rate of the full message, and
      a timing controller configured to shift a timing of transmitting or receiving the omitted message by a specific period, when the omission of the omitted message occurs depending on a result of the message check device.

2. The apparatus of claim 1, wherein the communication device uses Vehicle to Everything (V2X) communication.

3. The apparatus of claim 1, wherein the communication device uses Vehicle to Vehicle (V2V) communication.

4. The apparatus of claim 1, wherein the communication device transmits the full message in a form of a data packet.

5. The apparatus of claim 1, wherein the communication device transmits the full message in synchronization with a control cycle of the controller.

6. The apparatus of claim 1, wherein the full message includes:
   a message of a host vehicle, the message of the host vehicle received from the other vehicles, and information on the packet receive rate.

7. The apparatus of claim 6, wherein the message check device compares an internal packet receive rate of an internal full message of the controller with the packet receive rate, which is received using the communication device, of the full message to determine whether the packet receive rate of the full message is normal.

8. The apparatus of claim 7, wherein the message check device counts a jitter error when the packet receive rate is abnormal.

9. The apparatus of claim 8, wherein the message check device determines whether a jitter error rate is equal to or greater than a specific rate when a count value of the jitter error is in a preset count section.

10. The apparatus of claim 9, wherein the message check device determines to adjust the latency, when the jitter error rate is equal to or greater than the specific rate.

11. The apparatus of claim 10, wherein the specific rate is preset.

12. The apparatus of claim 10, wherein the specific rate is varied to correspond to a message transmitting or receiving timing of the other vehicles.

13. An apparatus for controlling platooning, the apparatus comprising:
   a controller;
   a communication device configured to
      receive a first message from the controller,
      receive a second message and a third message from other vehicles,
      generate a full message comprising received messages from the controller and from the other vehicles, and transmit the full message to the controller; and a message check device configured to check an omission of an omitted message from the full message and to check a packet receive rate of the full message, wherein the controller is configured to adjust a latency of the omitted message when the omission of the omitted message occurs, and shift a timing of transmitting or receiving the omitted message by a specific period, when the omission of the omitted message occurs depending on a result of the message check device.

14. The apparatus of claim 13, wherein the communication device uses Vehicle to Vehicle (V2V) communication.

15. The apparatus of claim 13, wherein the communication device transmits the full message in a form of a data packet.

16. The apparatus of claim 13, wherein the message check device checks a packet receive rate of the full message to determine whether the packet receive rate of the full message is normal.

17. The apparatus of claim 13, wherein the message check device counts up a jitter error to determine whether a count value of the jitter error is in a preset count range.

18. The apparatus of claim 13, wherein the message check device determines whether a jitter error rate is equal to or greater than a specific rate and determines to adjust the latency, when the jitter error rate is equal to or greater than the specific rate.

19. The apparatus of claim 18, wherein the specific rate is preset.

* * * * *